United States Patent [19]
Snider

[11] 3,883,720
[45] May 13, 1975

[54] OVEN FOR TESTING OR CALIBRATING PROBE-TYPE THERMOSTATS

[75] Inventor: Harold F. Snider, Mansfield, Ohio

[73] Assignee: Therm-O-Disc Incorporated, Mansfield, Ohio

[22] Filed: Dec. 3, 1973

[21] Appl. No.: 421,419

[52] U.S. Cl. ............... 219/535; 219/506; 219/548; 219/552
[51] Int. Cl. ............................................. H05b 3/58
[58] Field of Search ........... 219/502, 506, 512, 535, 219/546, 548, 552

[56] References Cited
UNITED STATES PATENTS

| | | | |
|---|---|---|---|
| 3,283,126 | 11/1966 | Velvel.............................. | 219/512 |
| 3,336,431 | 8/1967 | Biddulph......................... | 219/552 X |
| 3,381,212 | 4/1968 | Peltola et al.................... | 219/502 X |
| 3,453,450 | 7/1969 | Evalds............................. | 219/502 X |

OTHER PUBLICATIONS

IBM Tech. Disclosure Bulletin, "Memory Heater Control," Vol. 8, No. 8, M. J. Clark.

Primary Examiner—J. D. Miller
Assistant Examiner—Fred E. Bell
Attorney, Agent, or Firm—McNenny, Farrington, Pearne & Gordon

[57] ABSTRACT

There is provided an improved oven structure for testing or calibrating probe-type thermostatic switches and which is characterized by a linearly expansible body into which the cannula portion of the probe-type thermostatic switch may be inserted and heating means for raising the temperature of the body. The body is fixedly supported, for example adjacent one end, the balance of the body being free to move in response to changes in temperature. Heat regulating means in a control circuit are also provided to control the temperature, and coacting therewith means which coact between a point remote from the fixed location of said body and the heat regulating means for sensing the linear movement of said point relative to the fixed location and operable to control the heat regulating means. In a preferred embodiment, the body is an elongated member formed of a metallic conductor, e.g., stainless steel, through which high current at low voltage may be passed to cause heating and the resulting elongation of the body. The elongation is sensed and may be converted to a reading in degrees and/or utilized to control the heat regulating apparatus.

20 Claims, 5 Drawing Figures

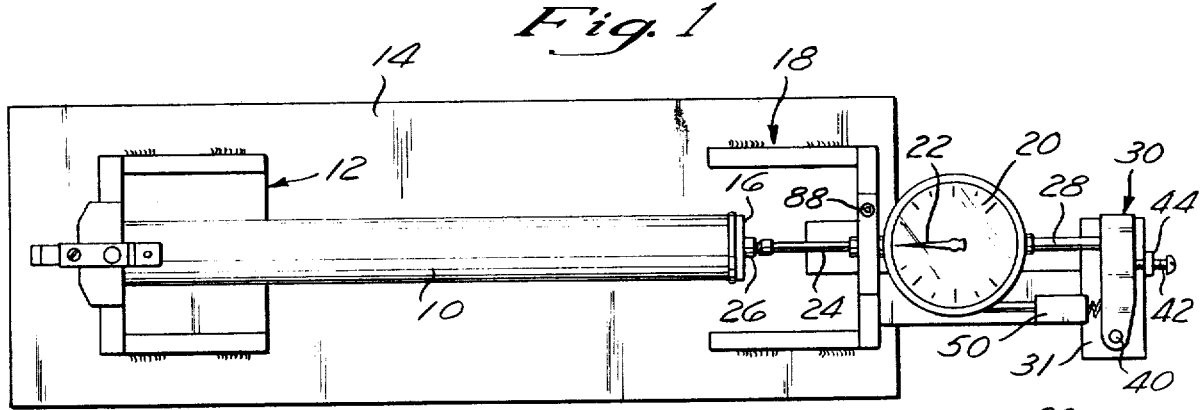
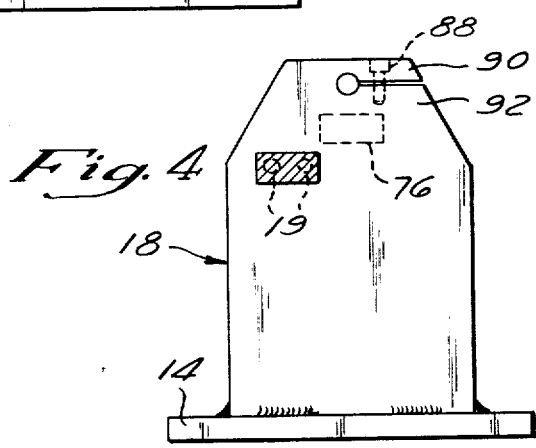
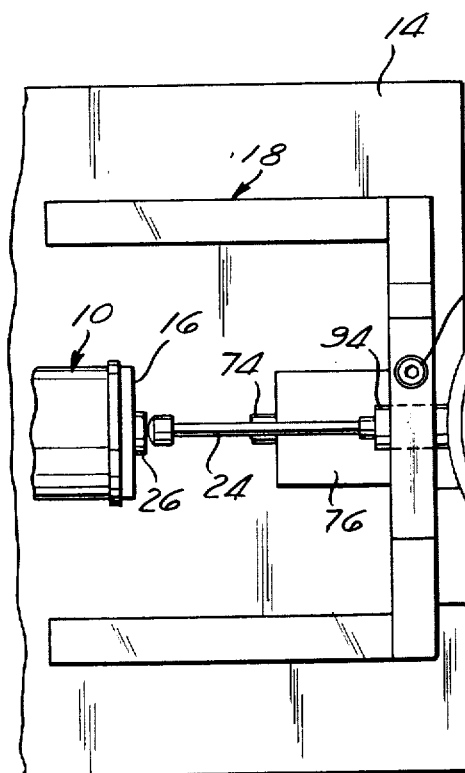

3,883,720

OVEN FOR TESTING OR CALIBRATING PROBE-TYPE THERMOSTATS

BACKGROUND OF THE INVENTION AND PRIOR ART

The present invention relates to an improved oven for the testing or calibration of probe-type thermostatic switches. Probe-type thermostatic switches are temperature sensitive electrical switches having many industrial and some home uses. These devices are composed of an elongated cannula portion and an electric switch portion. The cannula portion is a generally tubular body of one thermal coefficient of expansion having disposed therein a rod of another different thermal coefficient of expansion. When the rod and tube are heated or cooled, differential expansion or contraction occurs to operate the switch. In the particular thermostat illustrated the tube is a glass or ceramic having a low coefficient of expansion and the rod is a metal having a higher coefficient of expansion. The distal extremities of the outer member and the inner rod are arranged so that the expansion of the inner rod relative to the outer sheath is transmitted to the proximal extremity of the probe, and the relative movement of the two may there be sensed and caused to operate an electrical switch. The electrical switches are generally of two types, i.e., a "creep type" or a "snap type" switch. In either type, when the expansion or elongation of the inner tube has reached a sufficient point, and the relative movement between the inner and outer members of the probe reaches a predetermined value, the contact points of the switch are either separated gradually or a snap is tripped, causing the contact points to separate suddenly.

Probe-type thermostatic switches of these general types are fully shown and described in U.S. Pat. No. 3,732,518 dated May 8, 1973. The disclosure of this patent is incorporated herein in its entirety by reference thereto.

These thermostats may be adjusted by any suitable means such as a set screw, for example, which imposes a bias on a contact support arm, thereby enabling one, within certain limits, to set into the thermostat a predetermined temperature at which the contacts are open. In a snap-type switch, also as disclosed in U.S. Pat. No. 3,732,518, the point at which the snap operates may also be adjusted within limits by similar set screw means, for example.

In production, it is usually necessary to adjust or calibrate the assembled thermostat to operate at the desired calibration temperature. The present invention is useful in this connection. Also, it may be desirable, for quality control purposes, to test a calibrated thermostat to determine if in fact it operates at its desired calibration temperature. The apparatus of the present invention may be used also for this purpose.

Still further, while the foregoing uses of the apparatus hereof are primarily the concern of manufacturers of probe-type thermostatic switches, the ovens of the present invention may also be used by users of such switches for the purposes of testing for quality control or for effecting changes in the temperature at which the thermostat operates, for example by adjusting the set screw, as may be dictated by process considerations wholly within the control of the customer. The ovens of this invention are readily used by such customers for checking the temperature of operation of a given thermostat or adjusting the latter to a preselected temperature.

BRIEF STATEMENT OF THE INVENTION

Briefly stated, the present invention is in an oven for heating a probe-type thermostatic switch and which is characterized by a linearly expansible body dimensioned to receive the cannula or probe portion of a probe-type thermostatic switch. Means are provided for heating the body, and in a preferred embodiment the body is formed of a resistance material, e.g., stainless steel, and electrical contacts provided at the extremities thereof introduces high current at relatively low safe voltages. The passage of a heavy current through the body at a low voltage causes the temperature of the device to increase. To measure and enable regulation of the temperature, the body is fixedly supported at one location, for example at or near one extremity, the balance of the body being free to move in response to a change in temperature. Means are provided for regulating the heat input into the body; and, in preferred embodiments, a relatively simple electrical circuit is so provided. Finally, means are provided which coact between a point on the body remote from the fixed location of said body and the heat regulating means to sense mechanically the linear movement of the point relative to the fixed location. This movement may be translated into a visual representation of the temperature and/or operable to control the heat regulating means.

There is also provided in accordance with this invention a control system for an oven of the type above described which allows the oven to be operated in two distinct modes, the first being a quality control mode whereby the operability and the general range of temperatures in which the probe-type thermostatic switch is operable may be determined and secondly in a calibration mode whereby a probe-type thermostat may be adjusted to operate at a preselected temperature.

BRIEF DESCRIPTION OF THE DRAWINGS

The invention may be better understood by having reference to the annexed drawings wherein:

FIG. 1 is a top plan view of a preferred embodiment of an oven in accordance with the present invention showing a first support for fixing one end of the oven and a second support for a means such as a dial indicator to sense and visually represent the linear movement of the opposite end of the oven.

FIG. 2 is an enlarged fragmentary plan view partially in section showing one embodiment of means which coact between the movable end of the oven and the heat regulating means operable to control the heat regulating means.

FIG. 4 is an end elevation showing the second support with the dial indicator removed.

DETAILED DESCRIPTION OF THE DRAWINGS

Figure 3:
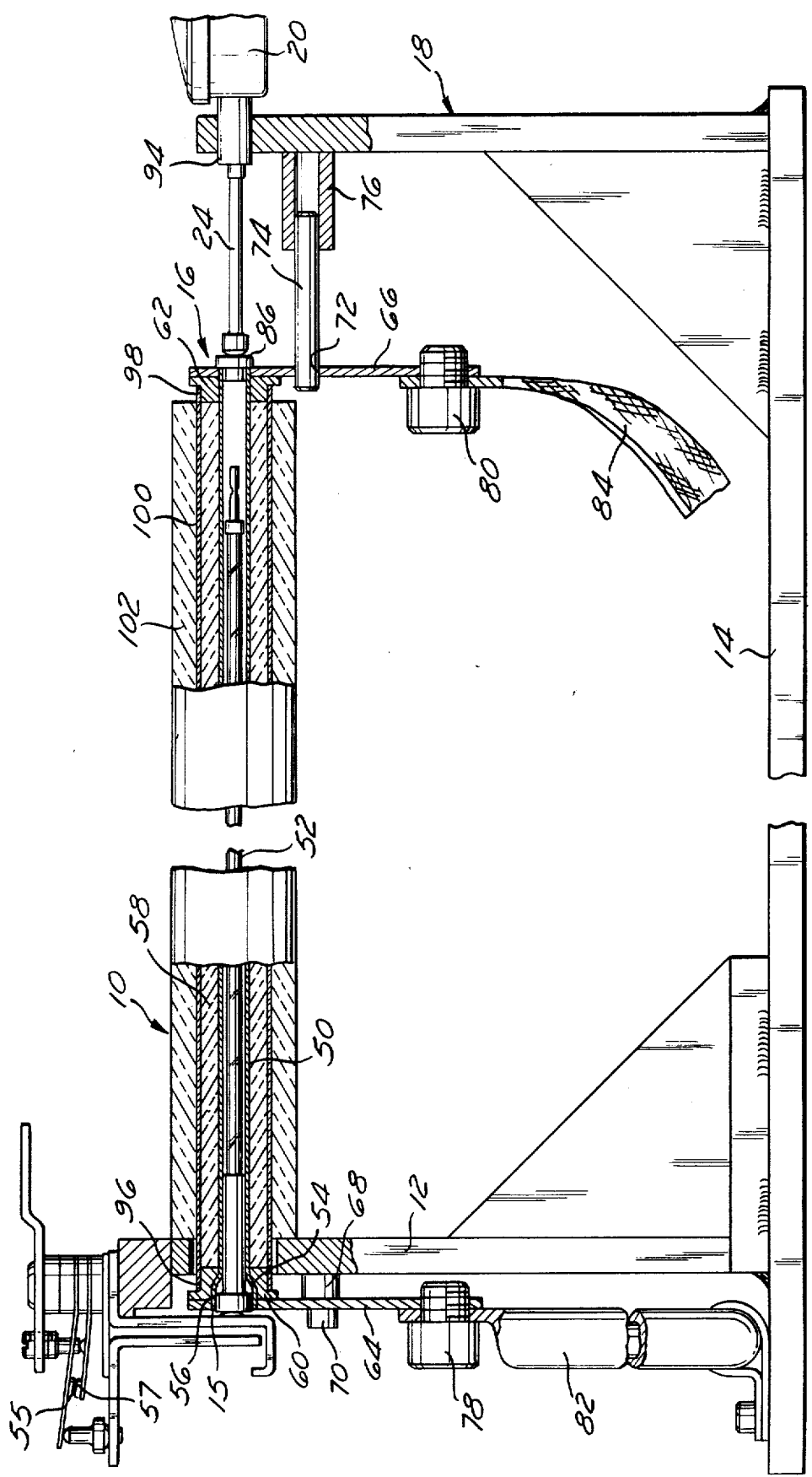
FIG. 3 is a side elevational view partially in cross section and on an enlarged scale of the oven apparatus shown in FIG. 1.

Referring now more particularly to FIG. 1, there is here shown an oven body 10 supported at one end by a bracket 12 which is in turn mounted on a base 14. The opposite end 16 of the oven body 10 is unsupported and free to expand or contract in response to temperature within the oven. There is supplied a second support or bracket 18 in which is mounted a dial indicator 20 which is graduated in temperature readings indicated by a needle or pointer 22. The needle is actuated by a sensing arm 24 which is in abutting contact with a movable point or plug member 26 hereinafter more particularly described. An extension arm 28 is movable with the sensing arm 24 and operates a limit switch member 30 carried by a T-bracket 31, also supported on the support member 18. As best shown in FIG. 2, the extension arm 28 moves into and out of a switch housing 32 and, when the extension thereof is sufficient, is operable to open the contacts 34 and 36, the latter being supported on the contact arm 38. The switch housing 32 is mounted on the T-block 31 so as to be able to pivot about the pin 40. The point at which the distal extremity of the extension arm comes into operative engagement with the contact arm 38 is adjustable and controlled by means of an adjusting screw 42 extending through an upstanding bracket 44 and into contact with the housing 32 at 46. A spring 48 coacting between an abutment 50 and the housing 32 biases the housing against the adjusting screw 42.

Referring now more particularly to FIG. 3, the oven 10 in a preferred embodiment includes an inner linearly expansible body 50 which is formed from an electrical conductor and expands axially in response to heat. It is formed of a material of relatively low resistance, for example stainless steel, and is dimensioned to receive and preferably closely envelop the cannula 52 of a probe-type thermostatic switch. As previously indicated, probe-type thermostatic switches of the type which may conveniently be tested or calibrated in the apparatus of the present invention are fully and completely disclosed in U.S. Pat. No. 3,732,518. The nature of the elongated linearly expansible body is such as to allow substantial amounts of current to be drawn at relatively low voltages, thereby providing for safe operation with sufficient power to heat the oven adequately.

One extremity 15 of the tube 50 is fixedly supported on the support or bracket 12 by a conductor plate 64 which provides a firm abutment as a reference point from which expansion of the tube 50 can be measured as hereinafter described. The supported end of the heating tube 50 is flared as at 54 to a larger diameter 56 to accommodate the swivel socket member of a probe-type thermostatic switch as described in the aforesaid patent.

The heating tube 50 is surrounded with a relatively thick primary insulating blanket 58 formed from a suitable insulation material such as a low conduction ceramic fiber. Insulation is desirable to aid in the retention of heat energy in the tube 50 and restricting the drop in temperature when the tube 50 is disconnected from the power source.

The oven body 10 also includes a pair of end insulating spacers 60 and 62, the spacer 60 being shaped to accommodate the flare 54, and the spacer 62 being located at the free unsupported extremity of the oven. The spacers have centered apertures for receiving the opposite ends 15 and 16 of the tube 50 and are each recessed slightly from the extremities of the tube 50 to accommodate the positioning thereover of tightly fitted or welded electrical conductors 64 and 66. The conductor element 64 is in turn stationarily supported against the bracket 12 by means of an insulating spacer 68 and a nonconducting bolt 70. Any suitable means of stationarily supporting the conductor 64 so as to be out of contact with metallic portions of the support may be employed. Thus the proximal extremity 15 of the tube 50 becomes fixed and provides the aforementioned reference point. Since the distal extremity 16 of the oven body 10 is free to move in response to changes in temperature and with reference to the fixed proximal extremity 15, so also must be the electrical conductor 66 which is also fixedly secured to the end of the tube 50. Accordingly, the electrical conductor 66 is provided with a bore 72 and mounted on a pin 74 which is in turn slidably mounted in a nonconducting sleeve 76 which is in turn secured to the support bracket 18 as by bolts 19 (FIG. 4). Thus, movement of the distal extremity 16 of the oven 10 is not impeded by the mounting of the electrical connection through the conductor 66.

As is shown in FIG. 3, the electrical conductors 64 and 66 tightly fit over the extremities 15 and 16 of the heating tube 50 and establish electrical contact therewith. The electrical conductors 64 and 66 are in turn bound by means of lug bolts 78 and 80 to leads 82 and 84, respectively, whereby electrical current is imposed directly across the heating tube 50.

The distal extremity 16 of the heating tube 50 is provided with a nonconducting plug 86 which serves as an abutment for operative contact with the sensing arm 24 of the dial indicator 20. The dial indicator 20 is suitably securely mounted opposite the free extremity 16 of the oven 10 in the bracket 18 and secured in that position by means of a screw 88 (FIG. 4) clamping the jaws 90 and 92 around the bushing 94 of the dial indicator instrument. The bushing 94 holds the dial indicator 20 stationarily while allowing the sensing arm 24 to move axially within the bushing in response to the change in length in the tubular member 50. Thus, movement of the tube 50 in a longitudinal direction is transmitted to the sensing arm 24 and in turn through the fixed shank 94 to the dial indicator 20 whereby a reading representative of the temperature of the tube 50 may be made.

The end plugs 60 and 62 are also provided with cylindrical portions 96 and 98, respectively, over which are the adjacent ends of a tubular shell or sleeve 100. These ends are installed with a loose fit to ensure that the sleeve 100 does not affect the movement of the plug 86. Surrounding the sleeve 100 there is desirably provided a secondary insulating blanket or sleeve 102 to further cut down heat loss.

Figure 5:
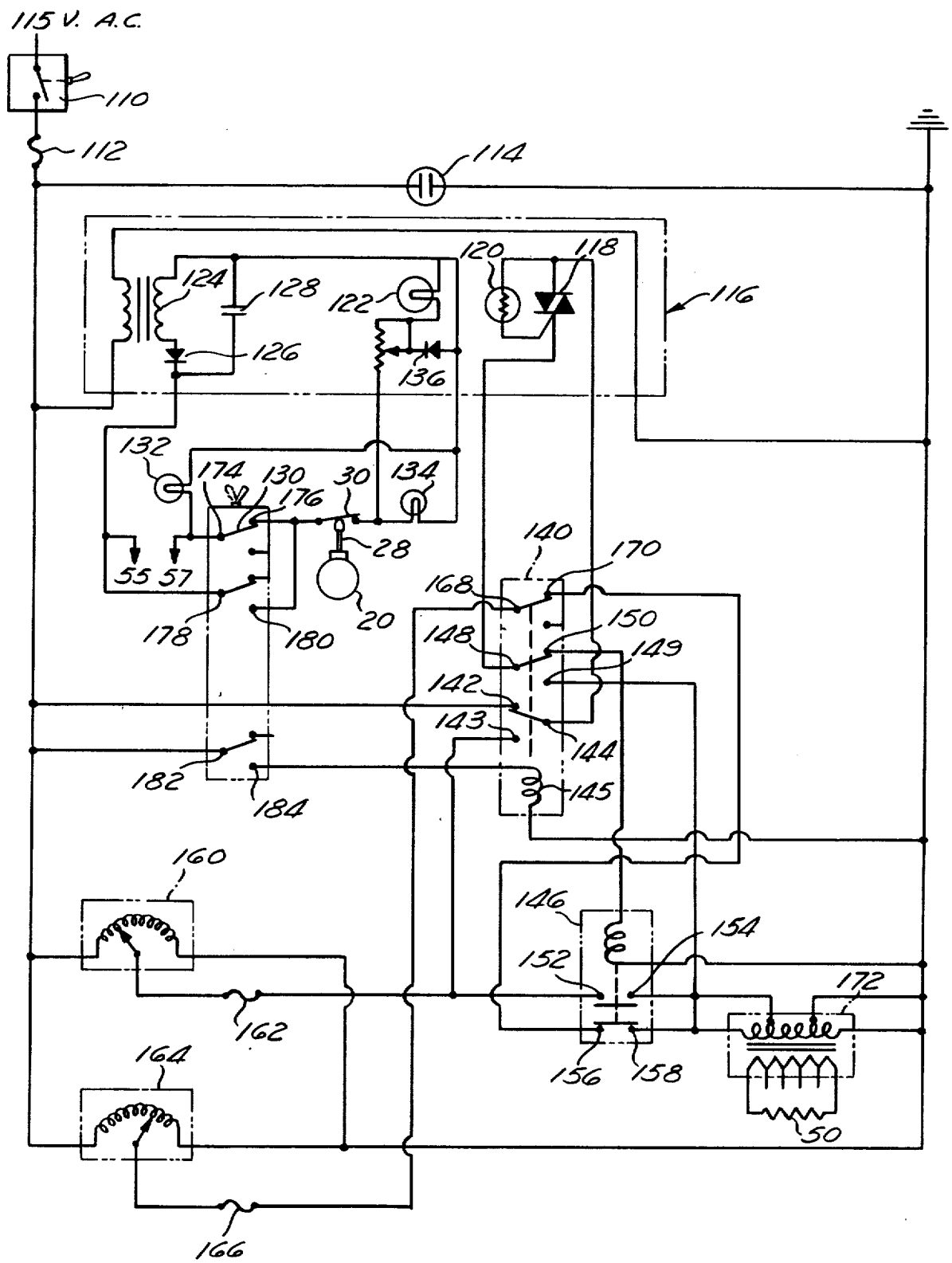
FIG. 5 is a schematic diagram of a preferred control system for the heating means.

FIG. 5 is a schematic diagram showing means for supplying and controlling electrical heating power supplied to the system through the leads 82 and 84. In referring to the schematic diagram, where reference is made to parts shown in the other figures, the reference characters used in the drawings will be used in connection with this discussion. Briefly, these elements include the heating tube 50 shown as a resistance in the schematic diagram; the limit switch 30 shown as a normally closed single-pole, single-throw switch with a mechanical operator corresponding to the extension arm 28 on the dial indicator 20; the probe thermostat switch contacts 55 and 57 shown as a normally closed, single-pole, single-throw switch.

The control circuit is further comprised of a single-pole, single-throw power switch 110 for connection to an alternating current power line and including a protecting fuse 112. Connected across the power line is a neon indicator light 114 for informing an operator that the switch 110 and the fuse 112 are in operating condition.

A photo-isolated power control generally indicated at 116 is conveniently used in the power supply circuit to smooth out interferring transients and to trigger the power element 118 at a safe voltage while permitting it to handle 115 volts AC. The power element 118 may be any suitable active three-terminal device capable of handling 115 volts AC power and triggered by a photo-resistor 120. The power element 118 shown in FIG. 5 is a triac chosen for its bilateral alternating current characteristics. It should be noted, however, that most three-terminal devices are operable within this circuit with little or no modification to the circuit.

The power element 118 is triggered into operation by suitable exciter means, e.g., the lighting of a triggering bulb 122 positioned where it will illuminate a photo-resistor 120. The illumination from the bulb 122 lowers the resistance of the photo-resistor 120 such that enough current will flow through the resistance of the photo-resistor 120 to actuate the power element 118. The triggering bulb 122 then has no physical or electrical contact with the power element 118. This isolation permits the bulb 122 to use low voltage direct current power obtained from a step-down transformer 124 and a half-wave rectifier diode 126 and a capacitor 128. Since low voltage direct current is supplied, the low power contacts of the probe thermostat 55 and 57 and the limit switch 30 may be used to control the triggering bulb 122.

There is provided a mode control switch 130 which is a three-pole double-throw switch. This switch enables the apparatus to be operated in one or the other of the calibration or quality control modes described above. When the switch 130 is in the position shown in FIG. 5, the apparatus is operable in a quality control or testing mode and the thermostat contacts 55 and 57 and the limit switch 30 act in series through the mode control switch 130 to illuminate the triggering bulb 122. When the mode control switch 130 is in its second or calibrating mode position, only the limit switch 30 controls the lighting of the bulb 122.

The power control 116 has two external lamps 132 and 134 that are illuminated when power is flowing through different parts of the circuit. The lamp 132 is a thermostat indicator lamp which is lighted when the thermostat contacts 55 and 57 are closed. The other lamp 134 is a heating lamp that is lighted when power is being supplied to the triggering bulb 122 and is lit when the power element 118 has been triggered into its conducting state. To further ensure the triggering of the power element 118, a Zener diode 136 and a current limiter 138 are used to regulate the voltage across the trigger bulb 122. This regulation provides a uniform signal for actuating the power element 118.

The power element 118 is connected with a power element relay 140. In FIG. 5 it is shown in a quality control mode wherein the relay 140 supplies 115 volts AC power through contacts 142 and 144 to the power element 118 which in turn delivers it to the coil of variac relay 146 through contacts 148 and 150. This actuates the variac relay 146 and forms a circuit across contacts 152 and 154. When the power element 118 is not in a conducting condition, the contacts 156 and 158 are closed because the coil of the realy 146 is deenergized. Thus, when the relay 146 is energized, voltage is supplied through the relay contacts 152 and 154, which contacts are normally open. Current then flows through a "high" variac 160 protected with a fuse 162. When the relay 146 is in its deenergized condition and contacts 156 and 158 are closed (the normal state for the relay 146 when the power element 118 is open), current then flows through the relay contacts 156 and 158 of relay 146 and the contacts 168 and 170 of relay 140 to provide a voltage supply to the "low" variac 164 protected with fuse 166.

The high variac 160 is set to supply enough power to heat rapidly the heating element 50 to increasingly elevated temperatures through a heating transformer 172. The low variac is set to perform a holding function so that the heating element 50 does not cool rapidly when the high variac is disconnected from the circuit.

The heating transformer 172 steps down the voltage of the variacs 160 and 164 and supplies a great amount of current at a low safe voltage to the heating tube 50 shown in FIG. 5 as a resistor.

The quality control mode serves two functions. The first is to test the calibration of the oven against a known reference. To this end a factory calibrated thermostat is obtained and inserted into the heating tube 50. Since both the thermostat contacts 55 and 57 and the limit switch 30 are normally closed, the high variac 160 powers the heating transformer 172 and brings the oven quickly up to operating temperature. When the factory calibrated thermostat switch operates, the light 132 is extinguished and at this point the temperature noted on the dial indicator 20. The dial face 21 is set to the proper position of the indicating needle 22 on the face when the oven is at the temperature at which the thermostat should operate. The face 21 is manually movable to a predetermined position. The limit switch 30 is set to a safe higher temperature. In the quality control mode and while quality control is taking place, the low variac 164 maintains the temperature of the oven so that as successive thermostats are checked and exert their cooling effect when inserted in the oven, no extensive period of warm-up is required.

A quality control mode permits successive thermostats to be tested by insertion of their probes into the oven and connection of their switch in the circuit. Since the thermostat switch and limit switch are closed, the oven is supported with high current until the thermostat switch opens. This extinguishes both of the indicator lights 132 and 134, providing the operator with a visual indication of the thermostat operation so that the indicator arm 22 can be noted to determine the thermostat operating temperature. Whenever the high circuit is not supplied, the low circuit is supplied through the variac 164 to maintain the oven at a temperature below but close to the temperature the thermostat should operate at. This minimizes the heat-up time for successive thermostats. In the event that a thermostatic switch happens to be inoperable, the power element 118 continues to be activated, placing into the circuit, then, the high variac 160. Should this continue indefinitely, and without the safety devices of the present invention, the oven could ultimately melt. Thus, the limit switch 30 is connected in series with the thermostatic switch contacts 55 and 57 and when the temperature and thus the length of the tube 50 reaches a point corresponding to a set temperature (determined by setting the switch 30 with set screw 42) above the quality control temperature, the switch 30 is opened, and the high variac 160 dropped out of the circuit. Thus, there is a safety override provided. When the high limit switch 30 opens, only the indicator light 134 goes out to provide an indication that the thermostat has failed.

In the calibration mode as above described, the mode control switch 130 is thrown to its second position opposite to that shown in FIG. 5 and contacts 178, 180, 182, and 184 now form circuits. As above described, the limit switch 30 alone now controls the trigger light 120 and controls the condition or state of power element 118. Toggling of the mode control switch 130 also actuates the power element relay 140 by energizing its coil 145 through the contacts 182 and 184. The result of the actuation of the relay 140 is to by-pass the variac relay 146 by closing the contacts 148 and 149 of relay 140, thereby providing power to the heating transformer 172 through the high variac 160 operating through contacts 143 and 144, the power element 118 and contacts 148 and 149. The low variac 164 is dropped from the circuit by breaking of contacts 168 and 170 when the relay 140 is energized. The calibration mode of operation then permits the high variac 160 to be controlled according to the state of the power element 118 to power heating transformer 172 and hence supply energy to the tube 50. Since the limit switch 30 controls the state of the power element 118 in this mode of operation, it also controls the power to the heating transformer 172.

In this second or calibration mode, the limit switch 30 is used to form a negative feed-back loop to cause the oven to hover at about a preselected temperature. The heating of the oven by the high variac 160 causes expansion of the tube 50, thereby breaking the contacts of the limit switch 30. This cuts the power to the heating tube 50 and allows the tube 50 to contract until the contacts of the limit switch 30 again close, restarting the cycle. By manually adjusting the high variac 160, an over-damped loop may be established to come to a set temperature within a short time. This closed loop system will establish an equilibrium point and move back toward the equilibrium point when a cold thermostatic switch is inserted or a calibrated thermostatic switch is withdrawn.

Calibration of a probe-type thermostatic switch utilizing this mode of operation is accomplished by allowing the oven to come to a predetermined temperature regulated by the operation of the switch 30. The reaching of this temperature is indicated by the on-off cycling of the indicator light 134. The thermostat is then at the calibration temperature. Calibration is then accomplished by adjusting the calibration screw, e.g., the set screw 21 in FIG. 1 of the aforesaid patent, until the thermostat switch operates and the indicator light 132 is extinguished. The thermostat indicator lamp 132 is lit only when the contacts 55 and 57 are closed and, therefore, provides the operator with a visual indication of the position of the thermostat switch 55, 57.

Although a preferred embodiment of this invention is illustrated, it should be understood that various modifications and rearrangements of parts may be resorted to without departing from the scope of the invention disclosed and claimed herein.

What is claimed is:

1. An oven for heating a probe-type thermostatic switch, said probe-type thermostatic switch having a switch portion and a cannula portion, said oven comprising in combination:
   a. a linearly expansible body defining an oven chamber dimensioned to receive said cannula portion;
   b. means for heating the body;
   c. means for fixedly supporting the body at one location, the balance of said body being free to move in response to a change in temperature;
   d. means for regulating the heat input to said body; and
   e. means coacting between a point remote from the fixed location of said body and said heat regulating means to sense linear movement of said point relative to said fixed location as a result of change in temperature and operable to control said heat regulating means.

2. An oven in accordance with claim 1 in which the linearly expansible body is an elongated tube.

3. An oven in accordance with claim 1 in which the linearly expansible body is formed of stainless steel.

4. An oven in accordance with claim 1 in which the linearly expansible body is formed of a conductor for electricity.

5. An oven in accordance with claim 4 in which the means for heating the body includes a source of electrical current and leads attached directly to the body.

6. An oven in accordance with claim 1 in which the linearly expansible body is a tube of stainless steel and the means for heating the tube include a source of electrical current and leads attached directly to the ends of said tube.

7. An oven for heating a probe-type thermostatic switch comprising in combination:
   a. a base;
   b. a first support on said base;
   c. an elongated oven including a linearly expansible body defining a probe enclosing chamber mounted on said first support adjacent the first extremity of said body, the opposite extremity being free;
   d. means for holding said first extremity of said tube stationary relative to said support;
   e. a second support on said base;
   f. means carried by said second support and coacting between said second support and the free extremity of said body for detecting the change in length of said expansible body and thereby sensing the temperature of said body;
   g. means for heating said body; and
   h. means for controlling the temperature of said body.

8. An oven for heating a probe-type thermostatic switch comprising:
   a. an elongated linearly expansible tubular metallic body;
   b. axially spaced electric terminals attached to said body substantially at its extremities;
   c. a source of electric current connected to said electric terminals for heating said body directly;
   d. means for determining the temperature of said body by sensing the change in length of said body in response to change in temperature.

9. An oven in accordance with claim 8 in which the tube is dimensioned to closely envelop the probe of a probe-type thermostatic switch.

10. An oven in accordance with claim 8 in which the sensing means includes a fixed abutment for one end of said body, and means contacting the other end of said body to sense the change in length thereof.

11. An oven in accordance with claim 8 also including means coacting with said sensing means for indicating the temperature of said body.

12. An oven in accordance with claim 8 also including means coacting with said sensing means for regulating the flow of electric current through said body.

13. A control system for an oven for heating a probe-type thermostatic switch comprising:
   a. an elongated linearly expansible metallic body defining an oven chamber dimensioned to receive the cannula portion of a probe-type thermostatic switch;
   b. electric terminals attached to said body at axially spaced points for passing current through said metallic body to cause heating of said chamber;
   c. a source of electric current and circuit means for connecting said source through a control circuit to said terminals for heating said body;
   d. means for sensing the change in length of said body with temperature;
   said control circuit including:
   1. power control means; and
   2. switch means coacting between said sensing means and said power control means to actuate said power control means in response to the change in length of said body.

14. A control system in accordance with claim 13 wherein said circuit means includes a rapid heating circuit and a holding heating circuit and switch means coacting with said power control for selecting between said heating circuits.

15. A control system in accordance with claim 13 wherein said power control means is a photo-isolated power control.

16. A control system in accordance with claim 13 wherein mode control means are provided which are operable to select a calibration mode and a quality control mode.

17. A control system in accordance with claim 16 wherein said mode control means is in a low voltage electrical circuit electrically isolated from said control circuit and coacting therewith through photo-actuating means.

18. A control system in accordance with claim 17 wherein said low voltage electrical circuit includes the normally closed terminals of a probe-type thermostatic switch and the switch means responsive to change in length of said body.

19. A control system in accordance with claim 18 wherein the low voltage circuit includes an exciter operable in response to the condition of the mode control means and the switch means responsive to the change in length of the body, and coacting with said power control to activate said power control in response to the condition of said exciter.

20. A control system in accordance with claim 19 in which said exciter is a lamp.

* * * * *